(12) United States Patent
Guri et al.

(10) Patent No.: US 10,515,215 B2
(45) Date of Patent: Dec. 24, 2019

(54) METHOD AND SYSTEM FOR PROTECTING COMPUTERIZED SYSTEMS FROM MALICIOUS CODE BY MEANS OF MUTABLE INSTRUCTIONS

(71) Applicant: MORPHISEC INFORMATION SECURITY 2014 LTD., Beer Sheva (IL)

(72) Inventors: Mordechai Guri, Modi'in (IL); Yuval Elovici, D.N. Lachish (IL); Gabi Kedma, Omer (IL)

(73) Assignee: MORPHISEC INFORMATION SECURITY 2014 LTD., Beer Sheva (IL)

( * ) Notice: Subject to any disclaimer, the term of this patent is extended or adjusted under 35 U.S.C. 154(b) by 17 days.

(21) Appl. No.: 15/566,147

(22) PCT Filed: Mar. 28, 2016

(86) PCT No.: PCT/IL2016/050331
§ 371 (c)(1),
(2) Date: Oct. 12, 2017

(87) PCT Pub. No.: WO2016/166744
PCT Pub. Date: Oct. 20, 2016

(65) Prior Publication Data
US 2018/0137280 A1 May 17, 2018

(30) Foreign Application Priority Data

Apr. 16, 2015 (IL) .......................................... 238336
Nov. 9, 2015 (IL) .......................................... 242523

(51) Int. Cl.
*H04L 29/06* (2006.01)
*G06F 21/56* (2013.01)
(Continued)

(52) U.S. Cl.
CPC .......... *G06F 21/566* (2013.01); *G06F 21/125* (2013.01); *G06F 21/51* (2013.01);
(Continued)

(58) Field of Classification Search
CPC ..................................................... G06F 21/566
See application file for complete search history.

(56) References Cited

U.S. PATENT DOCUMENTS 7,089,272 B1 * 8/2006 Garthwaite .......... G06F 12/0276
7,293,051 B1 * 11/2007 Printezis ............. G06F 12/0269
707/814
(Continued)

FOREIGN PATENT DOCUMENTS

WO 2014/111922 A1 7/2014

OTHER PUBLICATIONS

Lakhotia, Arun, Eric Uday Kumar, and Michael Venable. "A method for detecting obfuscated calls in malicious binaries." IEEE Transactions on Software Engineering 31.11 (2005): 955-968. (Year: 2005).*

(Continued)

*Primary Examiner* — Shawnchoy Rahman
(74) *Attorney, Agent, or Firm* — Venable LLP; Jeffri A. Kaminski

(57) ABSTRACT

The invention relates to a method for providing a computerized system which is protected from unauthorized programs coming from an external source, the method comprises the steps of (a) secretly, and in a manner unknown to authors of external programs, providing a non-standard compiler which mutates (modifies) each high level program to one or more non-standard mutated machine code instructions that a standard CPU cannot properly execute! (b) subjecting all authorized programs to said non-standard compiler; and (c) providing a translator which converts each (Continued)

mutated machine code instruction resulting from said non-standard compiler to a respective standard instruction which the CPU can properly execute, whereas any program which is not subjected to both said non-standard compiler and said translator will result in one or more instructions that the CPU cannot properly execute.

17 Claims, 7 Drawing Sheets

(51) Int. Cl.
    *G06F 21/51*     (2013.01)
    *G06F 21/12*     (2013.01)
    *G06F 21/53*     (2013.01)
    *G06F 21/14*     (2013.01)

(52) U.S. Cl.
    CPC ............ *G06F 21/53* (2013.01); *G06F 21/562* (2013.01); *G06F 21/14* (2013.01)

(56) References Cited

U.S. PATENT DOCUMENTS

| | | |
|---|---|---|
| 2006/0184922 A1* | 8/2006 | Vera .................. G06F 8/423 717/136 |
| 2007/0192620 A1 | 8/2007 | Challener et al. |
| 2009/0106540 A1 | 4/2009 | Haid |
| 2014/0304761 A1* | 10/2014 | Wicker ................ G06F 21/10 726/1 |

OTHER PUBLICATIONS

International Search Report of PCT/IL2016/050331, dated Jul. 6, 2016.
Written Opinion of PCT/IL2016/050331, dated Jul. 6, 2016.
International Preliminary Report on Patentability of PCT/IL2016/050331, dated Jul. 3, 2017.
Extended European Search Report dated Aug. 16, 2018 in European Application No. 16779701.8 (9 pages).

\* cited by examiner

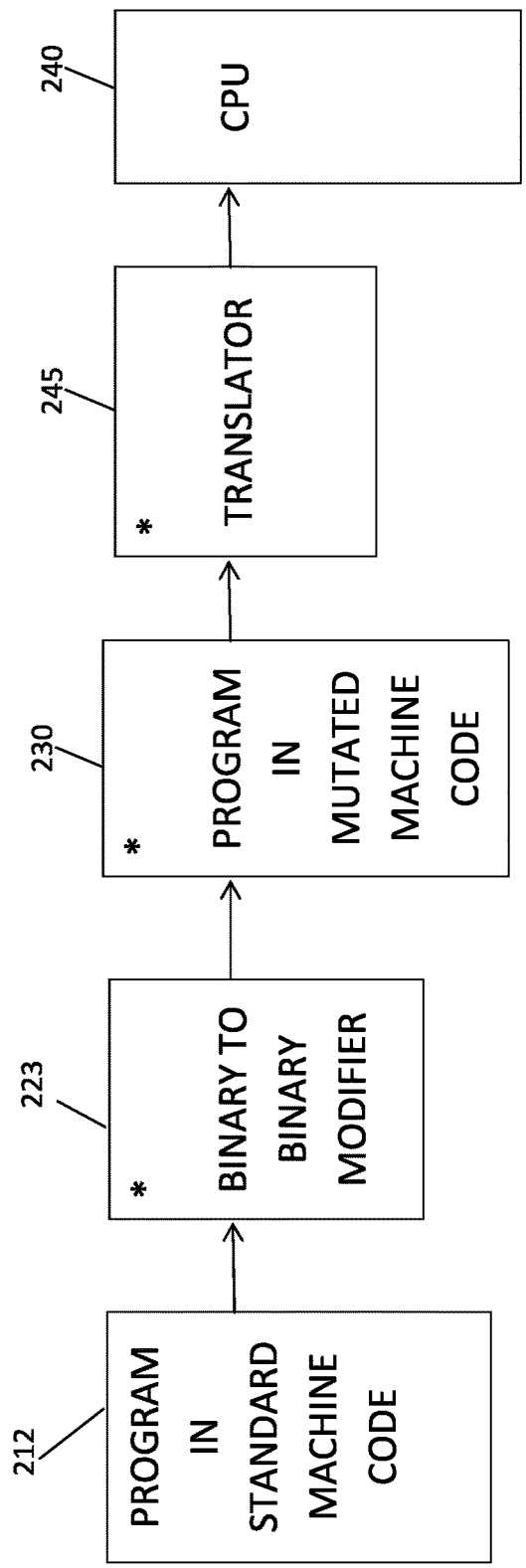

METHOD AND SYSTEM FOR PROTECTING COMPUTERIZED SYSTEMS FROM MALICIOUS CODE BY MEANS OF MUTABLE INSTRUCTIONS

FIELD OF THE INVENTION

The invention relates to the field of information security. More particularly, the invention provides a system and method for protecting a computerized system from malicious code. More specifically, the invention modifies instructions the instruction set of a given processor for preventing the expected operation of any unauthorized code including malicious software. Any code which is expected to run on the processor must be appropriately modified, otherwise it will fail or will cause an alarm.

BACKGROUND OF THE INVENTION

The art provides several manners by which a computerized system can be protected from malicious code:
 a. Preventing unauthorized code (hereinafter, also referred to as "program" or "application") from entering the system, by checking its validity (such as its signature, its originating source, etc.);
 b. Performing a static and/or dynamic analysis of the program to ensure that it does not include malicious code;
 c. Shielding the operating system from being exploited through known vulnerabilities by constantly patching such vulnerabilities as soon as they are exposed.
 d. Monitoring the behavior of suspicious programs while they run on the system or on a sandbox.

However, the abovementioned means of the prior art for protection of the computerized system suffer from at least one of the following flaws:
 a. They require a prior knowledge by the protector either with respect to the code, to its origin, or to its behavior;
 b. They require assumptions with respect to normal or anomalous behavior of the protected system.
 c. They require prior knowledge of exploitable vulnerabilities, and will not identify a new (hitherto unknown) exploit.
 d. They may detect the malicious behavior too late, after a significant damage has already been caused to the system including the protected resources.
 e. It is not clear when and how the malicious activity is triggered, furthermore, modern malware use evasion and anti-forensics techniques which severely hinder their detection.
 f. A previously certified program may at some stage open the gate for malicious code.
 g. Malicious code may operate solely in memory without passing through the file system.

The present invention is particularly, but not exclusively, applicable to any CPU whose ISA (Instruction Set Architecture) is available for compiler and/or assembler developers, where the programs' source code is given (Open Source). The concepts of the present invention can also be applied to binary code (Closed Source). Moreover, the present invention is particularly but not exclusively applicable to 'isolated' systems which are intended to run special purpose programs and are not designated to run a variety of third-party consumer applications; Yet the concepts of the present invention can be applied to other kinds of systems including mobile devices.

Over the last few years, there have been reports of highly protected computerized systems, even isolated ones, that were compromised by malicious programs. Unlike a regular consumer-oriented system, an isolated system is designated to run special purpose programs. Malicious exploitation of such systems may bear critical consequences. At the same time new kinds of devices such as smart phones are also compromised at an accelerating rate.

Open source programs are widely adopted in a wide range of domains, from smart phones to High Performance Computing (HPC). Open source programs may also be used in isolated systems.

It is therefore an object of the present invention to provide a method and system for protecting a computerized system from malicious code, either known or unknown, either on open source systems or on closed source systems.

It is another object of the present invention to provide a method and system for protecting a computerized system from malicious code, which overcomes all the above mentioned drawbacks of existing means for detection and prevention.

It is still another object of the present invention to provide a method and system for protecting a computerized system from malicious code, which does not require any prior knowledge about the malicious program, its structure, its behavior, or its origin.

It is still another object of the present invention to provide a method and system for protecting a computerized system from malicious code, which does not require any assumption with respect to the normal or anomalous behavior of the protected system.

It is still another object of the present invention to provide a method and system for protecting a computerized system from malicious code, which does not require prior knowledge of exploitable vulnerabilities.

It is still another object of the present invention to provide a method and system for protecting a computerized system from malicious code, which can prevent any operation of an unauthorized program, or to route it to operate in a restricted supervised mode.

It is still another object of the present invention to provide a method and system for protecting a computerized system from malicious code, which is immune to common evasion and anti-forensics techniques.

It is still another object of the present invention to provide a method and system for protecting a computerized system from malicious code which bypasses the standard gate keeping mechanisms of a protected system.

It is still another object of the present invention to provide a method and system for protecting a computerized system from malicious code which operates solely in memory without passing through the file system.

It is still another object of the present invention to provide a method and system for protecting a computerized system from malicious code, which may either replace conventional protection means, or may cooperate with them.

It is still another object of the present invention to provide a method and system for protecting a computerized system from malicious code, which may be easily updated on a periodical basis, and may include random ingredients to thwart a bypass by the attacker.

It is a particular object of the present invention to provide a method and system which operates at a very low level of the system, for protecting a computerized system from malicious code.

Other objects and advantages of the present invention will become clear as the description proceeds.

SUMMARY OF THE INVENTION

The invention relates to a method for providing a computerized system which is protected from unauthorized programs coming from an external source, the method comprises the steps of: (a) secretly, and in a manner unknown to authors of external programs, providing a non-standard compiler which mutates (modifies) each high level program to one or more non-standard mutated machine code instructions that a standard CPU cannot properly execute; (b) subjecting all authorized programs to said non-standard compiler; and (c) providing a translator which converts each mutated machine code instruction resulting from said non-standard compiler to a respective standard instruction which the CPU can properly execute, whereas any program which is not subjected to both said non-standard compiler and said translator will result in one or more instructions that the CPU cannot properly execute.

Preferably, said non-standard compiler is replaced by a disassembler and a mutating assembler, thereby to deal with programs that are not available in high-level source code.

Preferably, said non-standard compiler is replaced by a binary to binary modifier, thereby to deal with programs that are not available in high-level source code.

In addition to the above, the method of the invention further comprises the providing of a mutation engine for periodically producing a mutator which is applied to a standard compiler thereby to result in said non-standard compiler.

Preferably, said mutator is conveyed to said standard compiler by means of a secured updating channel.

Preferably, said translator is provided as a firmware component within each computer in the system.

Preferably, said mutation (modification) engine further produces updates to said translator, where each update corresponds to a respective current version of said mutator.

Preferably, each update to the translator is performed via a trusted updating channel.

Preferably, any program which is not subjected to both said pair of non-standard compiler and said translator either fails or raises an alert.

Preferably, the translator is applied to incoming instructions before the CPU fetches them.

Preferably, the translator is called from within the CPU upon fetching of each instruction

BRIEF DESCRIPTION OF THE DRAWINGS

In the drawings:

FIG. 2C describes a second manner by which the invention handles cases where only a binary machine code of an authorized program is available;

DETAILED DESCRIPTION OF PREFERRED EMBODIMENTS

As noted above, prior art means for protecting a computerized system from a malicious program suffer from various kinds of drawbacks. As will be shown, the present invention overcomes all said drawbacks.

Figure 1:
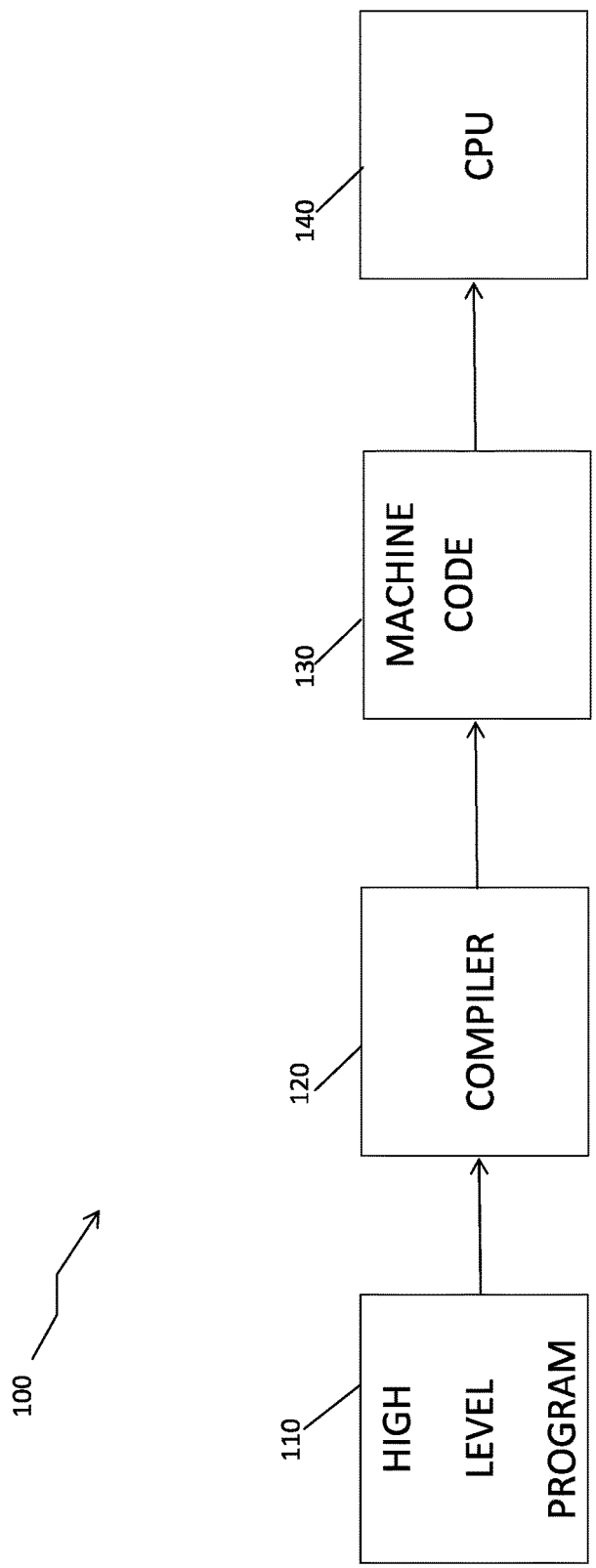
FIG. 1 discloses in schematic form a typical prior art process for converting a program written in high level language to operate on a CPU.

A typical well known prior art schematic process 100 for converting a program written in high level language to operate on a CPU is shown in FIG. 1. The high level code 110 is subjected to a compiler 120 which produces machine code 130 which in turn conforms to the instruction set of the CPU 140. The Instruction Set Architecture (ISA) of the CPU 140 provides a standard interface for developers of compilers and assemblers, and releases developers of high level programs from any low level concern with respect to compliance with the hardware. A program which was processed by an appropriate compiler or assembler can operate on any computer whose CPU complies with the given ISA.

An instruction typically comprises several fields, including an Opcode, one or more operands, and optional flags. Within a given ISA, the structure of the instruction and the specific values of the Opcodes assigned to each instruction are not expected to be changed.

Authors of benign and malicious code alike rely on this standardization and do not expect it to be changed across the life time of a target CPU. Once the compiled code has managed to access the CPU, the code is supposed to operate as expected, either if it is malicious or benign. Thus a malicious program which has successfully evaded existing defense mechanisms (e.g., anti-virus mechanism, firewalls and intrusion detection systems) will freely operate on the system, delivering its malicious payload.

Figure 2A:
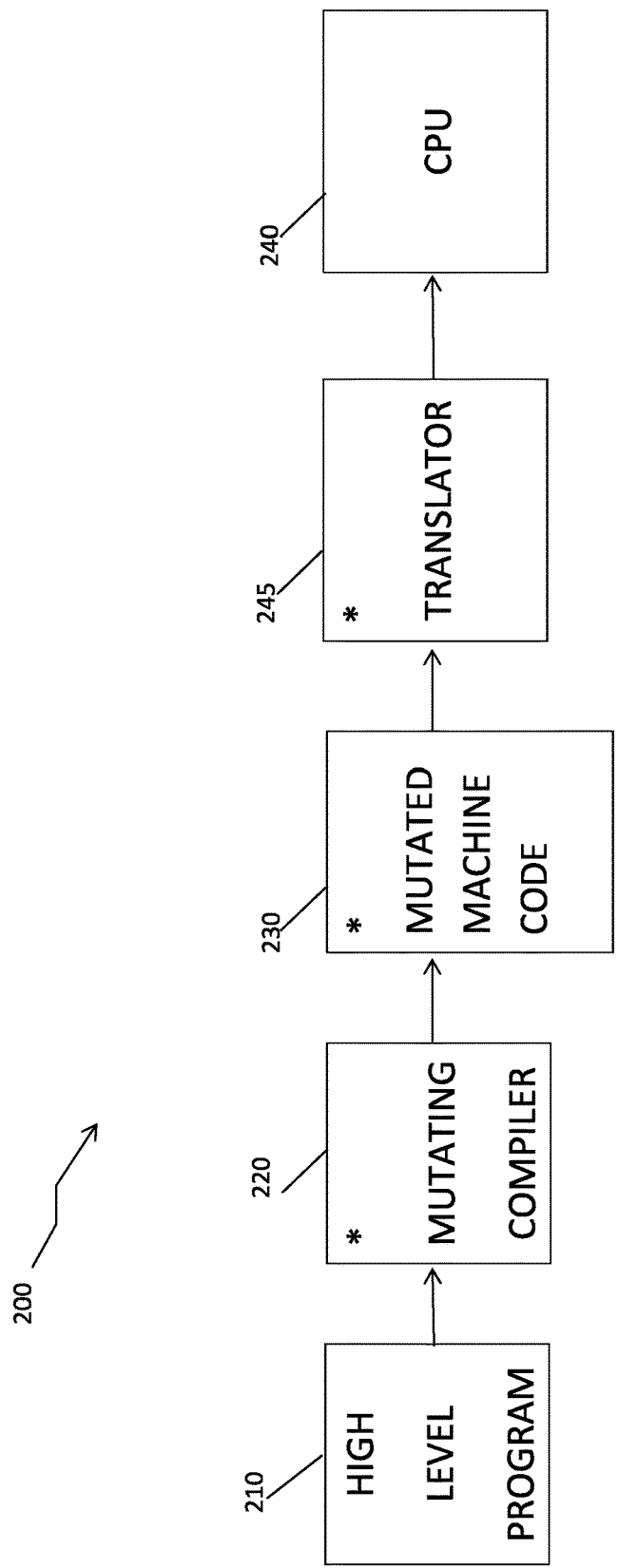
FIG. 2A generally describes in schematic form a process for converting a program written in high level language to operate on a standard or somewhat modified CPU according to an embodiment of the present invention.

As will be described herein, the present invention provides a new mechanism for overcoming said drawback. FIG. 2A generally describes in schematic form a process 200 for converting a program written in high level language to operate on a standard or somewhat modified CPU, according to an embodiment of the present invention. A high level code 210 is subjected to a mutating compiler 220. As used throughout this description, an asterisk sign (*) attached to an element within FIGS. 2A, 2B, and 2C indicates that this element is modified or newly introduced relative to the prior art. The mutating compiler 220 produces machine code 230 which conforms to a mutated instruction set. Note that the CPU 240 expects the machine code 230 to conform to its standard instruction set. Therefore, according to the invention a translator 245 is provided to transform the incoming machine code 230 back to the standard instruction set, thus allowing the CPU 240 to properly operate with the mutated machine code 230. As a result of this structure of the invention, a program that was not subjected to the (currently modified) mutating compiler 220 will fail to operate on the CPU 240 and will optionally raise an alert. Preferably, this modification (and other modifications that will be discussed hereinafter), are performed by a central security authority, in order to ensure best security and secrecy. Moreover, these modifications are preferably performed in a temporal basis, i.e., once every periodic or non-periodic time.

In one embodiment of the invention, and in addition to said modifications as elaborated above, also the translator itself may be modified on a temporal basis.

It should be noted that the modifications to the standard instruction set as processed by the mutating compiler 220 and the translator 230 are unique, and are kept secret. Furthermore, different versions of the modifications can be applied on a temporary basis to enhance the level of security. The modifications to the various elements should preferably be applied in a trusted and secured manner, to avoid leakage and exploitation of the system. The administrator or the security officer of the system are responsible to maintain a list of all authorized programs, and to subject each authorized program (and only an authorized program) to the mutating compiler 220 (in FIG. 2A) in order to be compatible with the current version of the instruction set. They are also responsible for subjecting each computer in the system to the respective modifications in the instruction set, i.e., to update the translator 245 in FIG. 2 to the current version of the instruction set (i.e., to synchronize the translator 245 with the version used by the mutating compiler 220).

Figure 2B:
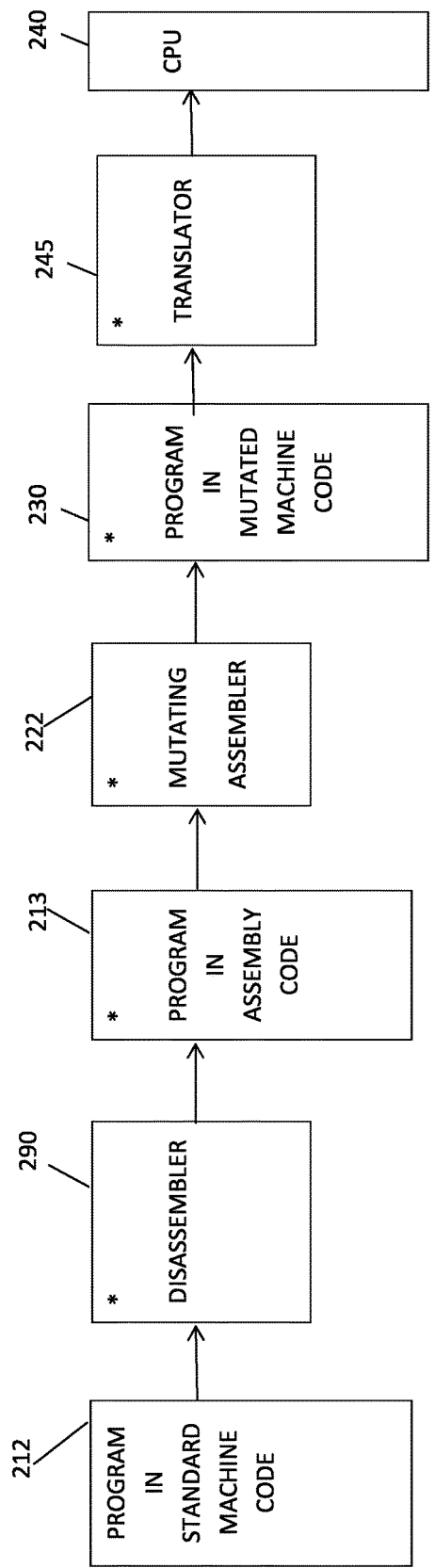
FIG. 2B describes a first manner by which the invention handles cases where only a binary machine code of an authorized program is available.

The description of FIG. 2A is suitable for cases where the source code of the authorized program is available, however, this is not always the case. FIGS. 2B and 2C describe how the invention handles cases where only the binary machine code of the authorized program is available. With reference to FIG. 2B, the program in standard binary machine code is indicated by numeral 212. This program is subjected to a disassembler 290, resulting in respective assembly code 213. Following said procedure, the assembly code is subjected to a (currently modified) mutating assembler 222 which produces the modified machine code 230, as discussed above with respect to FIG. 2A. The rest of the structure, i.e., units 245 and 240 are also the same as discussed above with respect to FIG. 2A.

FIG. 2C describes another embodiment of the invention where the program is available only in binary form. Similar to structure of FIG. 2B, the program in standard binary code is indicated by numeral 212. This program is subjected to a "binary to binary" modifier 223. The binary to binary modifier 223 converts the instructions of the program in standard machine code 212 directly to a modified form 230, similar to the modified machine code 230 as discussed above with respect to FIG. 2A. The rest of the structure, i.e., units 245 and 240 are also the same as discussed above with respect to FIG. 2A.

Figure 3:
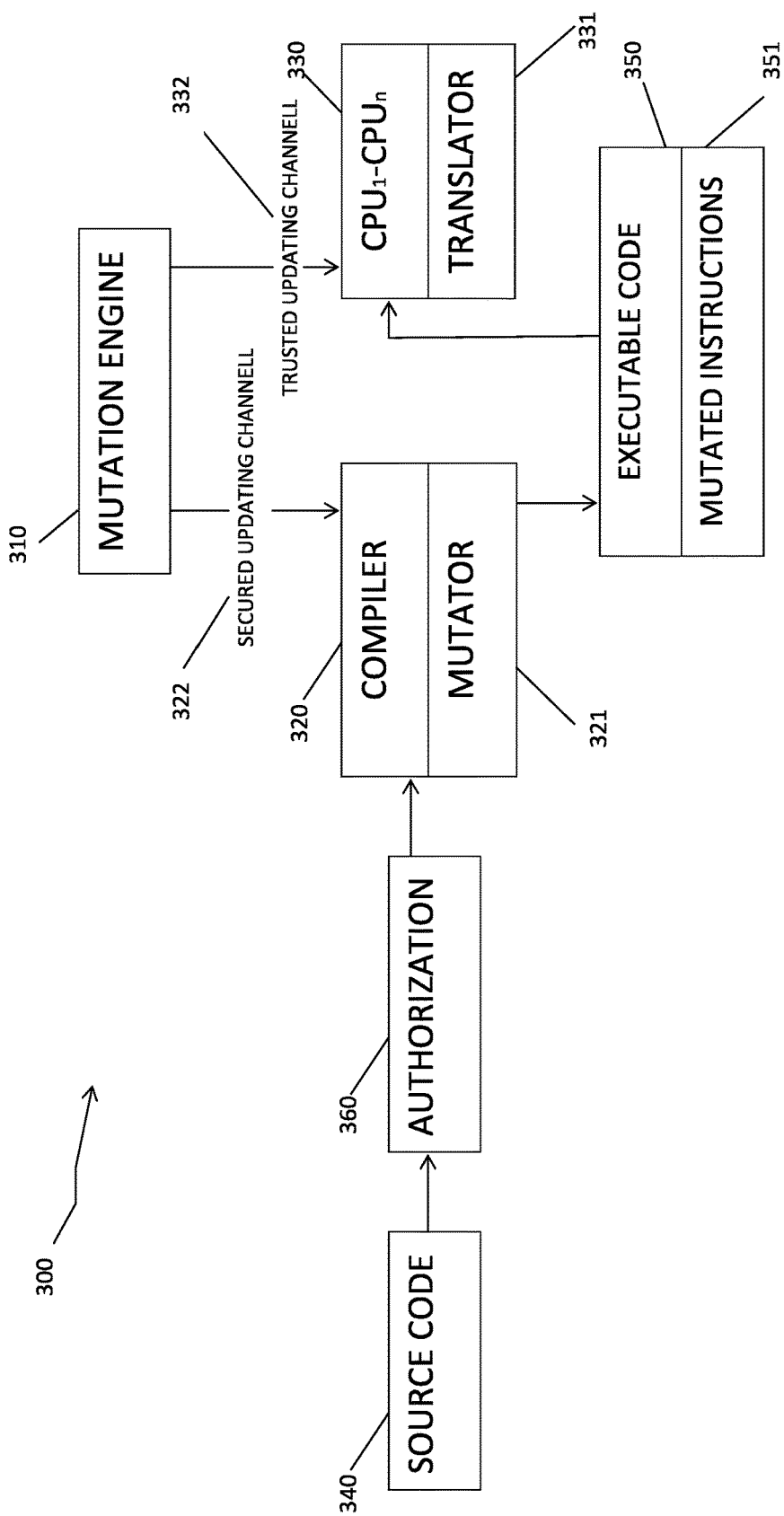
FIG. 3 illustrates a manner by which the invention is implemented in an organization.

FIG. 3 illustrates the manner by which the invention is implemented in an organization. In a first stage, the security administrator of the organization uses a Mutation Engine 310 to produce an updated Mutator 321 and Translator 331 that complement one another. The security administrator updates the compiler 320 of the organization via a secured update channel 322. By this update, a modified compiler as discussed in FIG. 2A is produced, by means of the updated Mutator 321. In fact, the Mutator 321 is a modular part of the compiler 320. Preferably, one central modifiable compiler is used within the entire organization for security reasons. In addition, the security administrator updates via a trusted update channel 332 each CPU 330 within the organization to include an updated translator 331 (Note that the translator 331 may or may not be considered as a part of the CPU 330). During the normal work of the organization, the security administrator strictly apply a policy according to which all the programs that are introduced into the organization, or that are used within the organization, are subjected to an authorization process 360. The authorization process 360 verifies that the code meets the policy of the organization regarding reliability, security, IP rights, etc.

The update channels 322 and 332 are protected against unauthorized access since unauthorized updates of the compiler's mutator 321 or the CPU translator 331 may compromise the protection as provided by the present invention. One preferable manner by which such protected update may be obtained is by enabling such access to the mutator 321 and particularly to the translator 331 only through a secured physical contact, as opposed to a networked contact. This manner of protection will eliminate the possibility of unauthorized remote software or firmware updates as used by advanced and persistent attackers.

During normal operation, all programs (either in source code or in binary machine code) that are introduced into the system are first subjected to the authorization process 360. FIG. 3 assumes that the program 340 is introduced into the system in a form of high level source code. The source code is then subjected to the modified compiler 320, resulting in a non-standard executable code 350, which contains mutated instructions 351. When the mutated executable code 350 is submitted to the modified CPU 330 and the translator 331, it will appropriately be executed. However, any code which has not been subjected to both the authorization process 360 and to the modified compiler 320 will fail to appropriately run, and will be noticed by the system.

As noted above, the scheme of FIG. 3 assumes that the program 340 is introduced into the system in a form of high level source code. In case that the program is introduced in a form of a binary machine code, the general scheme is still valid with modifications as explained with respect to FIGS. 2B and 2C. More specifically, the only elements of FIG. 3 that are affected are the compiler 320 and the mutator 321.

Note that only a small portion of the standard instruction set has to be modified. Preferably, those instructions that have to be modified are those that are most commonly used. For example, instructions like MOV, JMP, or CALL, or their equivalents are good candidates to be modified since it is hard to imagine programs that do not use them, but still can provide any substantial functionality (whether benign or malicious).

Figure 4A:
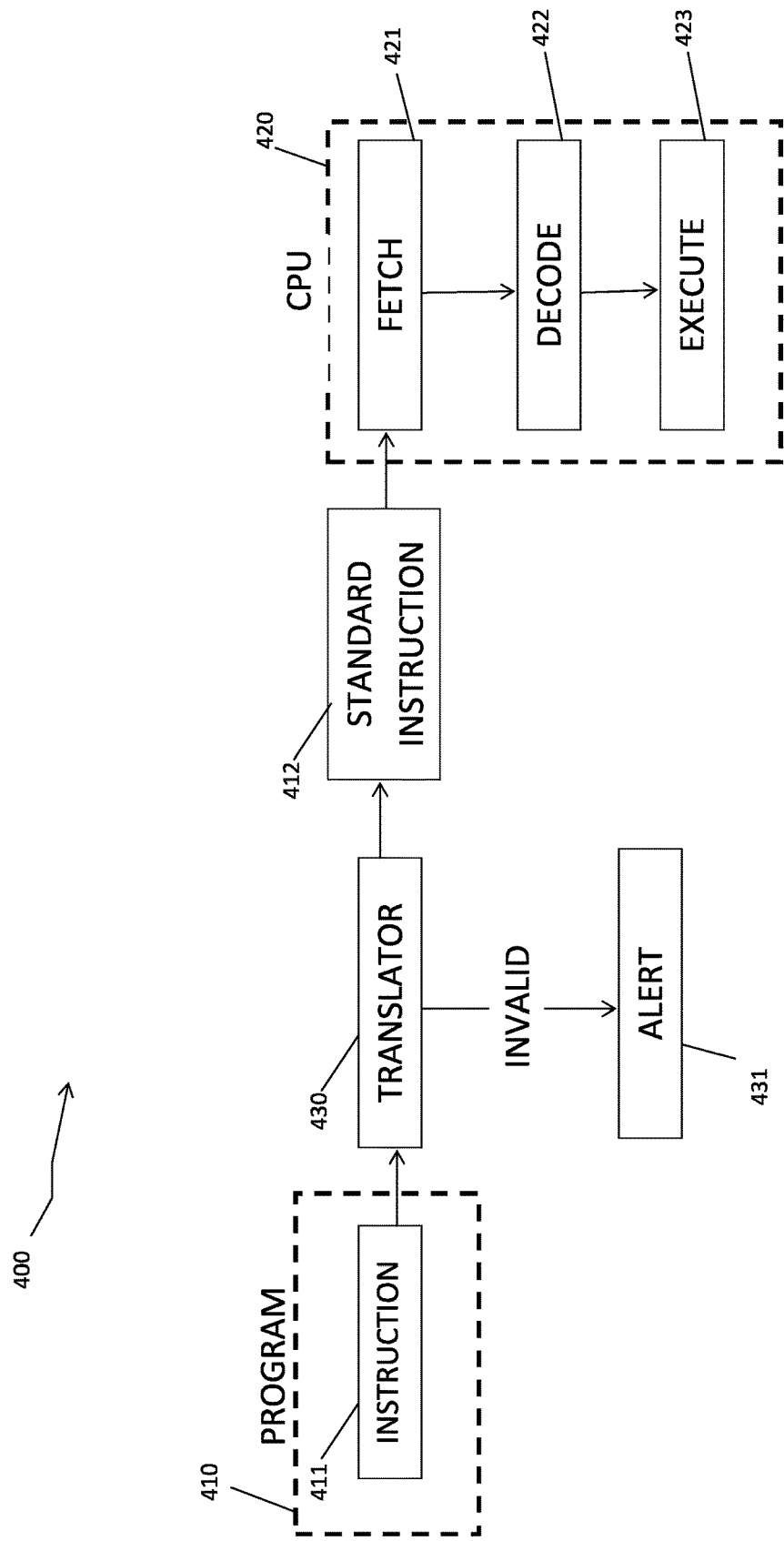
FIG. 4A illustrates a first embodiment of the invention relating to an interaction between the CPU and a program in the form of a binary machine code.

FIG. 4A illustrates a first embodiment 400 of the invention relating to the interaction between the CPU and a program in the form of a binary machine code. The program 410 is essentially a sequence of instructions that are introduced to the CPU. According to this embodiment, when an instruction 411 arrives, it is first handled by translator 430 to verify that this instruction 411 conforms to the current version of the instruction set. If the translator finds that this is not the case, the translator initiates an alert 431, and it may also take any further action as necessary in view of this invalid situation. Otherwise, if the translator finds that the instruction 411 in fact conforms to the currently modified instruction set, the translator continues by converting this modified instruction 411 to the form of a standard instruction set which is normally accepted by the standard CPU 420. More specifically, having the converted instruction 412 in standard form, the CPU 420 continues by fetching 421, decoding 422, and executing 423 the instruction 412 in a conventional manner.

As noted, the translator 430 in fact performs two functions, as follows: (a) verifying that the incoming instruction 411 conforms to the currently modified instruction set; and (b) only if the instruction conforms to the current version of the instruction set, the translator converts the instruction to the stand form of this instruction, respectively. Note, however, that the invention does not require conversion of the full instruction set (as discussed above). The above two functions of the translator may be carried out, for example, by means of a look up table, a function, etc.

The embodiment 400 of FIG. 4A has two main advantages, as follows: (a) the translator 430 can handle a batch of instructions in a rate which is independent of the CPU execution rate; and (b) the CPU itself remains fully standard and needs no modification.

Figure 4B:
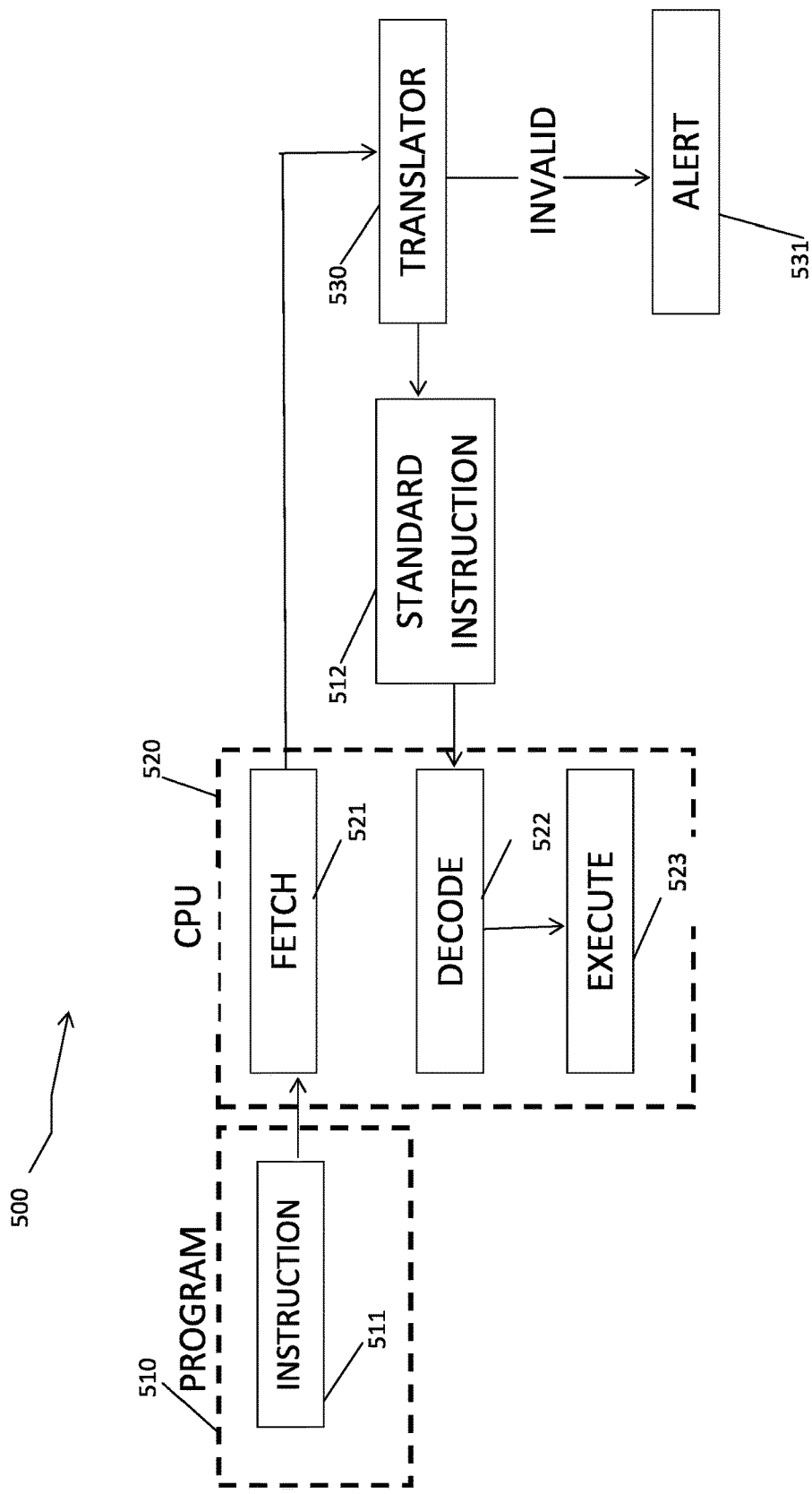
FIG. 4B illustrates a second embodiment of the invention relating to an interaction between a CPU and a program in the form of a binary machine code.

FIG. 4B illustrates a second embodiment 500 of the invention relating to the interaction between the CPU and a program in the form of a binary machine code. As in FIG. 4A, the program 510 is essentially a sequence of instructions that are introduced to the CPU. When an instruction 511 arrives at the CPU 520, it is first fetched 520, and then conveyed to the translator 530. The translator 530 first verifies that this instruction 511 conforms to the current version of the instruction set. If the translator finds that this is not the case, the translator initiates an alert 531, and it may also take any further action as necessary in view of this invalid situation. Otherwise, if the translator finds that the instruction 511 in fact conforms to the currently modified instruction set, the translator continues by converting this modified instruction 511 to the respective form as in the standard instruction set which is normally accepted by the standard CPU 520. More specifically, having the converted instruction 512 in standard form, the CPU 520 continues by decoding 522, and executing 523 of the instruction 512 in a conventional manner.

The functions performed by the translator 512 are essentially the same as performed by the translator 412 of FIG. 4A. The embodiment of FIG. 5A is advantageous, as it enables a finer control over the process. However, this latter embodiment may require hardware modification of the CPU beyond the conventional structure.

As noted, the translator itself (preferably firmware) is also subject to modifications by the central security authority, on a temporal (or periodical) basis. Such modifications are done either at the physical location of the central security authority, or transmitted to the target machines through a secured channel. Note that these temporal modifications may include the instruction-set of the translator itself (i.e., go beyond the dictionary or "map" which may be used by the translator). Also, on each temporal modification, each specific machine of the organization (possibly including its translator component) may be subject to different modifications compared to other machines of the organization. Consequently, even if an attacker somehow breaches one machine, the others remain protected.

As also noted, the present invention can suffice with a modification of a very small subset of the whole instruction-set, including so called 'default' ones such as branching-related instructions. This feature enables trapping and diverting malicious code, possibly to a "sand-boxed" environment. In contrast, a possible system that requires modification of a large subset of the instruction set would require shuffling with possible overlaps, that and will not allow such trapping and diverting. Furthermore, in the present invention, since 'default' instructions, e.g. branching-related ones, can be modified, reversing the modified system or the modified translator becomes extremely complicated, to the point of being practically non-feasible, also in view of the temporal nature of the modifications.

It should also be noted that the system and method disclosed by the present invention are not limited to hardware/firmware instruction-sets. Possible embodiments can be implemented at the software layer (virtual machine), e.g. Java or .Net instruction-sets at the byte-code level.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for providing a computerized system which is protected from unauthorized programs coming from an external source, the method comprises the steps of:
   a) secretly, and in a manner unknown to authors of external programs, providing a mutating compiler which mutates each high level program to one or more mutated machine code instructions that a standard CPU cannot properly execute;
   b) subjecting all authorized programs to said mutating compiler;
   c) providing a translator which converts each mutated machine code instruction resulting from said mutating compiler to a respective standard instruction which the standard CPU can properly execute, whereas any unauthorized program which is not subjected to both said mutating compiler and said translator will result in one or more instructions that the standard CPU cannot properly execute; and
   d) providing a mutation engine for periodically producing a mutator which is applied to a standard compiler thereby to result in said mutating compiler,
   wherein each of said mutated machine code instructions is an instruction which is modified in structure or op-code without overlaps compared to the standard ISA in a manner that the translator can trap instructions that are supposed to be modified but in fact have not been modified as illegal instructions; and said mutation engine further produces updates to said translator, where each update corresponds to a respective current version of said mutator.

2. The method of claim 1, wherein said mutating compiler is replaced by a disassembler and a mutating assembler, thereby to deal with programs that are not available in high-level source code.

3. The method of claim 1, wherein said mutating compiler is replaced by a binary to binary modifier, thereby to deal with programs that are not available in high-level source code.

4. The method according to claim 1 wherein said imitator is conveyed to said standard compiler by means of a secured updating channel.

5. The method according to claim 1, wherein said translator is provided as a firmware component within each computer in the system.

6. The method according to claim 1, wherein each update to the translator is performed via a trusted updating channel.

7. The method according to claim 1, wherein said any unauthorized program which is not subjected to both said pair of mutating compiler and said translator either fails or raises an alert.

8. The method according to claim 1, wherein the translator is applied to incoming instructions before the CPU fetches them.

9. The method according to claim 1, wherein the translator is called from within the CPU upon fetching of each instruction.

10. The method according to claim 1, wherein the mutations are made on a temporal, periodic or non-periodic basis.

11. The method according to claim 1, wherein said mutations are performed by a central security authority using one central mutating complier in order to ensure best security and secrecy.

12. The method according to claim 1, wherein said mutations differ between one machine of the organization to another.

13. The method according to claim 1, wherein the translator itself is also mutated on a temporal basis in order to ensure best security and secrecy.

14. The method according to claim 1, wherein mutations to core instructions, including branching instructions, are made thus modification to a small subset of the instruction set is sufficient.

15. The method according to claim 1, wherein malicious code is trapped by a detection of any of said non-standard instruction, and is diverted to a sandboxed environment.

16. The method according to claim 15, wherein said trapping and diversion becomes possible when mutating of only a small subset of the instruction set is performed, avoiding shuffling and overlaps.

17. The method according to claim 1, wherein mutations are made to instructions at the software bytecode layer.

\* \* \* \* \*